United States Patent [19]

Williams

[11] Patent Number: 5,044,206

[45] Date of Patent: Sep. 3, 1991

[54] STRUCTURAL LOAD ANALYSIS APPARATUS

[76] Inventor: Graham R. Williams, 8 Larch Croft, Redwood Drive, Tividale, Warley, West Midlands, England

[21] Appl. No.: 512,333

[22] Filed: Apr. 23, 1990

[51] Int. Cl.⁵ ............................................. G01N 19/00
[52] U.S. Cl. ...................................... 73/804; 434/302
[58] Field of Search ................... 73/804, 849; 434/302

[56] References Cited

U.S. PATENT DOCUMENTS 1,551,282  8/1925  Beggs .................................... 73/804

FOREIGN PATENT DOCUMENTS 448300  6/1936  United Kingdom .................. 73/804

Primary Examiner—Jerry W. Myracle
Attorney, Agent, or Firm—Leon Gilden

[57] ABSTRACT

A structural load analysis apparatus is provided with a plurality of spaced pairs of box beams provided with aligned series of apertures therethrough. The apertures receive upper and lower pairs of "C" shaped support channels for receiving "U" shaped deflection beams thereon. The upper and lower aligned pairs of box beams are spaced by pilot bars and "L" shaped flanges positioned on upper and lower edges of respective lower and upper pairs of box beams, whereupon loading of the deflection beams presents deflection of the "L" shaped plates. Deflection may be measured by micrometer or by transducer for input into a computer for subsequent analysis.

9 Claims, 4 Drawing Sheets

STRUCTURAL LOAD ANALYSIS APPARATUS

BACKGROUND OF THE INVENTION

1. Field of the Invention

The field of invention relates to load model analysis, and more particularly pertains to a new and improved structural load analysis apparatus wherein a model of a load structural organization is presented for analysis of deflection and stress due to the loading.

2. Description of the Prior Art

Classroom as well as field analysis in civil and constructional engineering requires analysis based on loading of beams and the like wherein it is impractical to provide analysis based on actual situations and it is economical feasible and desirable to provide model analysis. To this extent, the instant invention provides measurable deflection between joint surfaces when subject to a load. The prior art has utilized various model organizations to attempt to provide this teaching, but has heretofore failed to provide the effective and expedient organization of the instant invention. Examples of the prior art include U.S. Pat. No. 4,371,344 to Gorczyca wherein a tension model device is disclosed wherein three struts cross each other at or near a center portion of each strut joined to a removable block through which the struts are secured relative to one another to provide a tension model for alignment of struts.

U.S. Pat. No. 3,567,221 to Stults sets forth a balancing game and teaching aid wherein various loads are positioned overlying a beam for balancing of the loads in a teaching analysis to individuals.

U.S. Pat. No. 3,636,640 to Chambers sets forth a model for determining weight components of mass on inclined planes, wherein the mass is positioned on a force applying structure inclined to provide representations of such mass distribution.

U.S. Pat. No. 3,651,584 to Perry sets forth a stress pattern analysis in photo-elastic models wherein load is applied to provide various stress patterns in the model corresponding to various loads contemplated during actual conditions.

U.S. Pat. No. 3,656,241 to Chambers sets forth an experimental derrick and ladder assembly utilizing elongate straight beam demonstrating equilibrium phenomenon in classroom physics.

As such, it may be appreciated that there is a continuing need for a new and improved structural load analysis apparatus which addresses both the problems of simplicity in organization as well as effectiveness in use, and in this respect, the present invention substantially fulfills this need.

SUMMARY OF THE INVENTION

In view of the foregoing disadvantages inherent in the known types of stress analysis models now present in the prior art, the present invention provides a structural load analysis apparatus wherein the same provides for model deflection and stress and strain analysis during beam loading conditions and provides datum points for measuring such deflection and stress. As such, the general purpose of the present invention, which will be described subsequently in greater detail, is to provide a new and improved structural load analysis apparatus which has all the advantages of the prior art load analysis models and none of the disadvantages.

To attain this, the structural load analysis apparatus of the instant invention comprises a plurality of spaced pairs of aligned beams wherein each pair of aligned beams is spaced in aligned relationship relative to one another by an internally positioned pilot bar. The pilot bar is securable through apertures positioned within each of the beams. "L" shaped deflection plates are positioned at lower and upper respective edges of the upper and lower beam of each beam pair wherein a lowermost aperture of each upper beam is elongate to enable deflection of the upper "L" shaped deflection plate for analysis of the deflection thereof. Spaced pairs of "C" shaped support bars receive "U" shaped deflection beams therewithin, wherein the deflection beams are loaded by means of point loads or elongate loads for providing load analysis data. Spaced assemblies may be utilized wherein spaced and aligned load deflection beams may be spanned by means of a slab support bracket for loading the bracket.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved structural load analysis apparatus which has all the advantages of the prior art stress analysis models and none of the disadvantages.

It is another object of the present invention to provide a new and improved structural load analysis apparatus which may be easily and efficiently manufactured and marketed.

It is a further object of the present invention to provide a new and improved structural load analysis apparatus which is of a durable and reliable construction.

An even further object of the present invention is to provide a new and improved structural load analysis apparatus which is susceptible of a low cost of manufacture with regard to both materials and labor, and which accordingly is then susceptible of low prices of sale to the consuming public, thereby making such structural load analysis apparatus economically available to the buying public.

Still yet another object of the present invention is to provide a new and improved structural load analysis apparatus which provides in the apparatuses and methods of the prior art some of the advantages thereof, while simultaneously overcoming some of the disadvantage normally associated therewith.

Still another object of the present invention is to provide a new and improved structural load analysis apparatus wherein the same enables deflection analysis based on various point and elongate loads positioned upon deflection beams.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2:
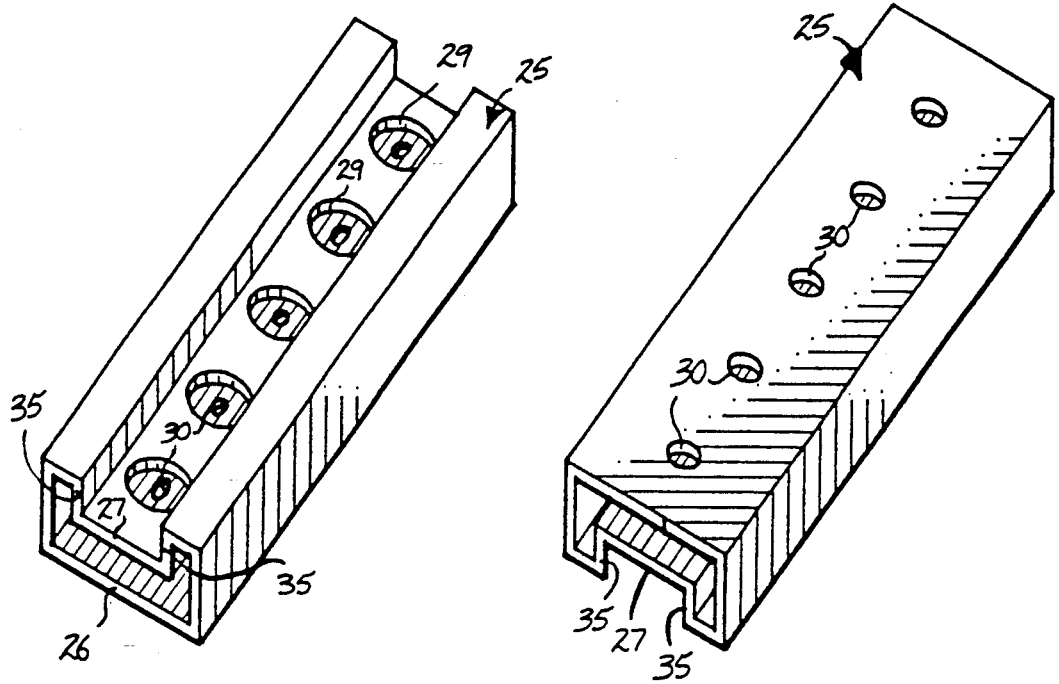
FIG. 1 is a top isometric illustration of a "U" shaped deflection beam utilized by the instant invention.
FIG. 2 is a bottom isometric illustration of the "U" shaped deflection beam utilized by the instant invention.
Figures 3, 4:
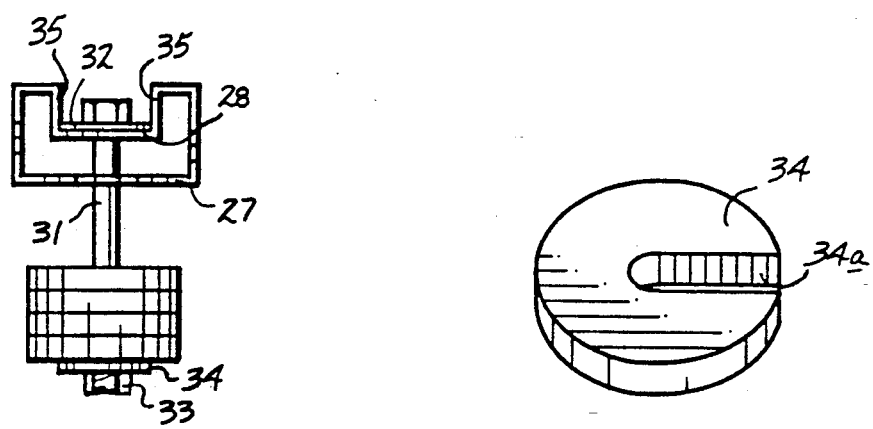
FIG. 3 is a cross-sectional view illustrating a typical point load positioned on a deflection beam.
FIG. 4 is an isometric illustration of a slotted weight utilized to provide various point loads in combination with the instant invention.
Figure 5:
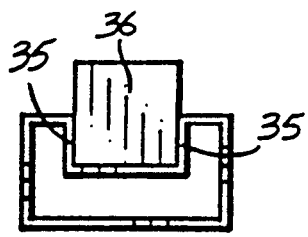
FIG. 5 is a cross-sectional view illustrating an elongate load supported by the deflection beam of the instant invention.

With reference now to the drawings, and in particular to FIGS. 1 to 10 thereof, a new and improved structural load analysis apparatus embodying the principles and concepts of the present invention and generally designated by the reference numeral 10 will be described.

More specifically, the structural load analysis apparatus 10 of the instant invention essentially comprises (see FIG. 10) a plurality of pairs of aligned box beams comprising a first and third respective box beam 11 and 13 defining a first pair with a second and fourth aligned box beam 12 and 14 defining a second pair, wherein each of the pairs of aligned box beams include a series of aligned apertures defining first aligned apertures 11a within the first box beam 11, second aligned apertures 12a within the second box beam 12, third aligned apertures 13a directed through the third box beam 13, and fourth aligned apertures 14a directed through the fourth box beam, wherein the apertures are orthogonally directed and through-extending each of the box beams for reception of fasteners for various components of the organization. A first "C" shaped support includes first "C" shaped apertures 15a and 15b (see FIG. 9) for securement to the first box beam, wherein similarly a second "C" shaped support 16, a third "C" shaped support 17, and a fourth "C" shaped support 18 are respectively secured to the second, third, and fourth box beams 12, 13, and 14. It is noted that the apertures directed through each of the "C" shaped supports are of a space equal to the spacing defined between each of the aligned apertures 11a, 12a, 13a, and 14a. Threaded fasteners 19 secure the "C" shaped supports 15 through 18 to the respective box beams. At each lower terminal end of each upper box beam 11 and 12, and at each terminal end of each lower box beam 13 and 14, is secured a respective "L" shaped indicator plate defined by a first indicator plate 20 secured to a lowermost edge of the first box beam, a second "L" shaped indicator plate 21 secured to the upper terminal edge of the third box beam 13, a third "L" shaped indicator plate 22 secured to the lower terminal edge of the second box beam 12, and a fourth "L" shaped indicator plate 23 secured to the upper terminal edge of the fourth box beam 14, wherein each of the the "L" shaped indicator plates are formed with a through-extending aperture for securing to the "L" shaped plates through an associated aperture adjacent each of the terminal ends of the associated box beams. It shoudl be noted that the lower terminal ends of each upper box beam 11 and 12 for example includes an elongate end aperture 11b, as illustrated in FIG. 8, to enable deflection of the respective "L" shaped plate relative to the lower terminal end of the upper box beam.

Figure 6:
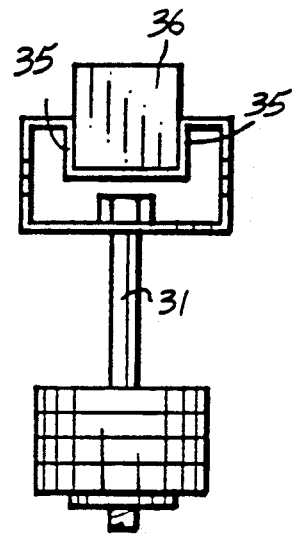
FIG. 6 is a cross-sectional orthographic illustration of a combination elongate load member and point load utilized by the deflection beam of the instant invention.
Figures 8, 9:
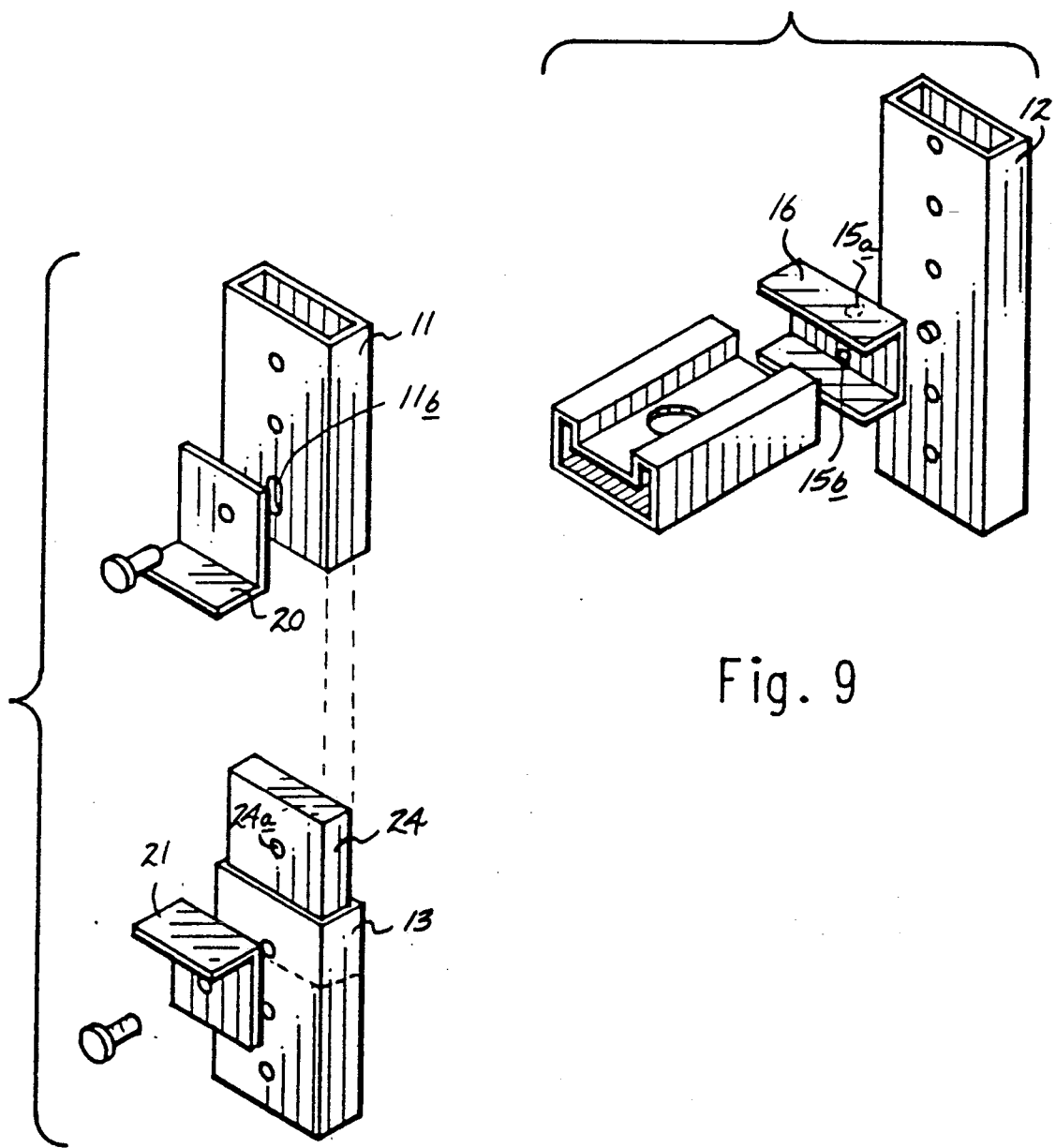
FIG. 8 is an isometric illustration, somewhat exploded, illustrating the relationship of an upper and lower beam arrangement and their association.
FIG. 9 is an isometric illustration of a box beam and support arrangement for the deflection beam of the instant invention.
Figure 10:
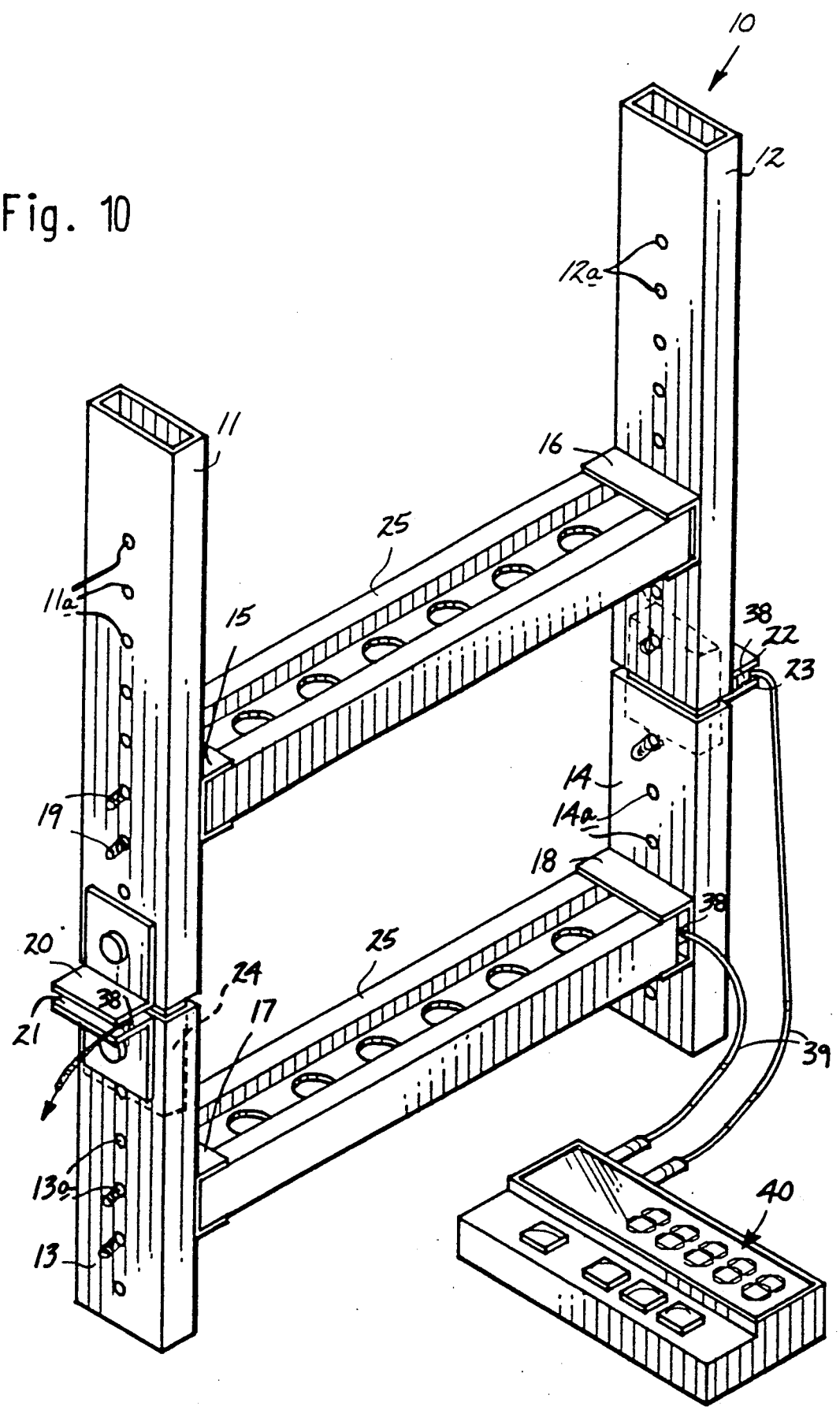
FIG. 10 is an isometric illustration of the instant invention in an assembled configuration.

A pilot bar 24 is formed with bar apertures 24a directed therethrough wherein the bar apertures 24a are spaced a predetermined distance equal to the spacing of the aligned apertures 11a through 14a to enable securement of the pilot bar 24 interiorly of each of the respective pairs of box beams 11 and 13, and 12 and 14, as illustrated in FIG. 8 for example. The pilot bar 24 positioned and securing each of the pairs of upper and lower box beams together enables deflection of the box beams upon loading thereof. Loading is effected by use of a "U" shaped deflector beam 25 wherein the deflector beam is positioned between the upper and lower pairs of aligned "C" shaped supports 15, 16, and 17 and 18, as illustrated in FIG. 10. The "U" shaped deflector beams 25 are formed with a bottom wall parallel to and spaced from a top wall 28, wherein the top wall 28 is of a narrower width than that of the bottom wall to define side walls 35 directed upwardly of the top wall 28, wherein the side walls 35 are of a width equal to a width of a parallelepiped load member 36 nestable within the elongate parallelepiped recesses defined by the side walls 35 and the upper surface of each of the top wall 28. The top wall 28 includes a series of top wall openings 29 of a first diameter overlying and coaxially aligned with bottom wall openings 30 of a second diameter less than that of the first diameter, wherein a support bolt 31 defines a shank of a diameter substantially equal to that of the second diameter, wherein a support washer 32 may mount the support bolt 31 on the top wall 28 overlying each of an associated opening 29. If desired to position the support bolt 31 underlying the top wall openings 29, the washer 32 is merely eliminated wherein the support bolt is directed downwardly, as illustrated in FIG. 6, to lie below the top wall 28 and rest upon an upper surface of the bottom wall 30. In this manner, both point loads defined by slotted support disks 34 mounted about the shank of each support bolt 31 may be utilized in combination with an elongate load member 36, as illustrated in FIG. 6. The load member 36 is defined by a width substantially equal to the width of the top wall 28 defined between side walls 35 to prevent repositioning of the load member 36 during load analysis.

Figure 7:
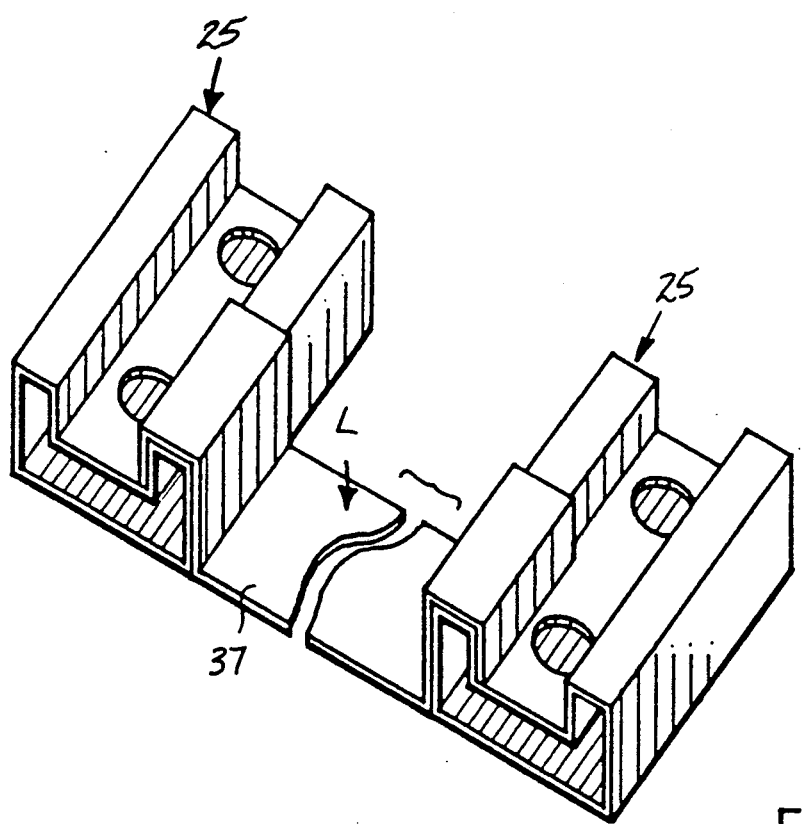
FIG. 7 is an isometric illustration of a slab support bracket positioned between spaced pairs of deflection beams utilized by the instant invention.

FIG. 7 is illustrative of a slab support bracket 37 defined by a planar central floor and "U" shaped downwardly oriented ends of a width substantially equal to the width of the side walls 35, wherein spaced load deflection beams 25 may be assembled utilizing plural pairs of the assemblies 10 to provide further analysis of loads between spaced deflection beams 25, as illustrated in FIG. 7.

In use, transducer centers 38 may be positioned between upper and lower horizontal flanges of each of the associated pairs of "L" shaped indicator plates 20-21, 22-23 to direct such information to an associated logic circuit computer with a further transducer positioned between a "C" shaped support plate 15 and associated deflection beam 25. In this manner, various loadings, both point and elongate support loads, may be positioned upon the apparatus 10 to effect analysis thereof. It should be further borne in mind that the elongate slots 11b positioned at each end of the associated box beams 11 and 12 enable the deflection to take place as the beam will deflect about the pilot bars 24.

As to the manner of usage and operation of the instant invention, the same should be apparent from the above disclosure, and accordingly no further dicussion relative to the manner of usage and operation of the instant invention shall be provided.

In compliance with suggested Patent Office procedure, the above description of the invention has been limited to the describing of a single embodiment thereof. However, it should be realized that the invention can be utilized for many different structural load analysis, and all of these various uses are intended to be encompassed by the claims appended hereto. For example, the present invention could be utilized with assemblies far more complex and sophisticated than those detailed in FIG. 10. In this regard, whole building frameworks can be assembled in scaled-down form, while bridges or similar structures can be considered with small adjustments to joint design where angled members are employed. The invention design concept also includes the fact that the member 37, as shown in FIG. 7, could be a series of pieces which, when all slotted in, would form a scaled-down floor area upon which loads could be imposed. With this in mind then, loads acting upon individual beams or floor areas are transmitted throughout the assembled structure so as to be indicated at the integral transducer points at some distance from the imposed loading points.

Additionally, the computer/load or movement translator could include an option whereby it would have a fixed program to enable the operator to be able to switch from those load reactions which would be provided by a steel framed structure to those provided by a pre-stressed concrete, or even a timber framed, structure.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A structural load analysis apparatus comprising, in combination,
   a first and second box beam secured in aligned end to end relationship spaced from a third and fourth box beam aligned in an end to end relationship, and
   a first and second deflection indicator plate secured respectively to each lower end of first and third box beam, and
   a third and fourth deflection indicator plate secured to each upper end of the second and fourth box beams, and
   load deflection beam members mounted between confronting sides of the first and third box beams and the second and fourth box beams for accommodating a predetermined load thereon to effect deflection between the first and third deflection indicator plates and the second and fourth deflection indicator plates to enable measurement of such deflection based on the predetermined load, and
   measurement means positioned between the first and third and second and fourth deflection indicator plates to measure the deflection therebetween.

2. A structural load analysis apparatus as set forth in claim 1 wherein the first, second, third, and fourth box beams each include aligned apertures orthogonally directed therethrough, the aligned apertures spaced apart a predetermined distance.

3. A structural load analysis apparatus as set forth in claim 2 wherein the load deflection beam members are mounted onto "C" shaped support members, the "C" shaped support members include further apertures, the further apertures spaced apart the predetermined distance to receive fastener members directed through the further apertures of the box beams to selectively position the "C" shaped supports along the opposed confronting sides of the box beams.

4. A structural load analysis apparatus as set forth in claim 3 wherein lowermost apertures of the apertures of the first and third box beams are elongate, and the load deflection members are secured through the lowermost apertures to enable deflection of the first and second indicator plates when secured to lowermost ends of the first and third box beams.

5. A structural load analysis apparatus as set forth in claim 4 wherein the load deflection beam members are of a generally "U" shaped cross-sectional configuration defining a top wall spaced above and parallel to a bottom wall, the top wall including apertures of a first diameter directed therethrough overlying and coaxially aligned with bottom wall apertures of a second diameter greater than the first diameter, and point beam members securable to the load deflection beam members wherein the point load members include an elongate shank supporting slotted weights thereon to position loads upon the load beam members to define at least a portion of the predetermined load.

6. A structural load analysis apparatus as set forth in claim 5 wherein the top wall is spaced between side walls and the side walls are spaced apart a predetermined side wall distance to accommodate an enlongate load between the side walls, wherein the predetermined load is of a generally parallelepiped configuration.

7. A structural load analysis apparatus as set forth in claim 6 wherein the measurement means include transducers operatively secured to a computer member to register deflection information.

8. A structural load analysis apparatus as set forth in claim 7 wherein the first and second box beams include a pilot bar securing the aligned ends of the first and second box beams together, and the third and fourth box beams include a further pilot bar to secure the aligned ends of the third and fourth box beams together.

9. A structural load analysis apparatus as set forth in claim 8 wherein the pilot bar and the further pilot bar are complementarily received within each of the respective ends of the first and second and third and fourth box beams respectively, and the pilot bar and the further pilot bar include pilot bar apertures therethrough, wherein the pilot bar apertures are spaced apart the predetermined distance equal to the spacing defined by the predetermined distance between the aligned apertures within the box beams.

* * * * *